Nov. 21, 1933.　　　　F. T. MOORE　　　　1,936,254
REVERSIBLE FEED MECHANISM FOR MACHINE GUNS
Filed Dec. 19, 1932
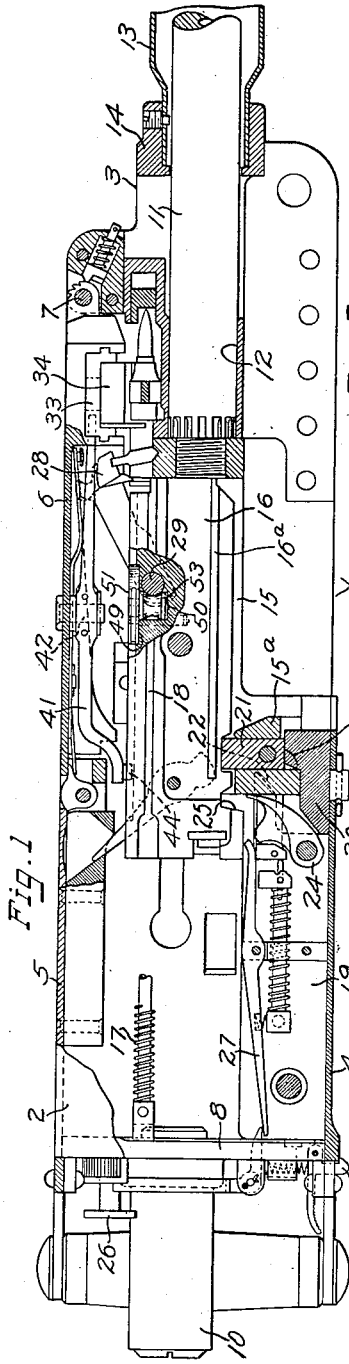
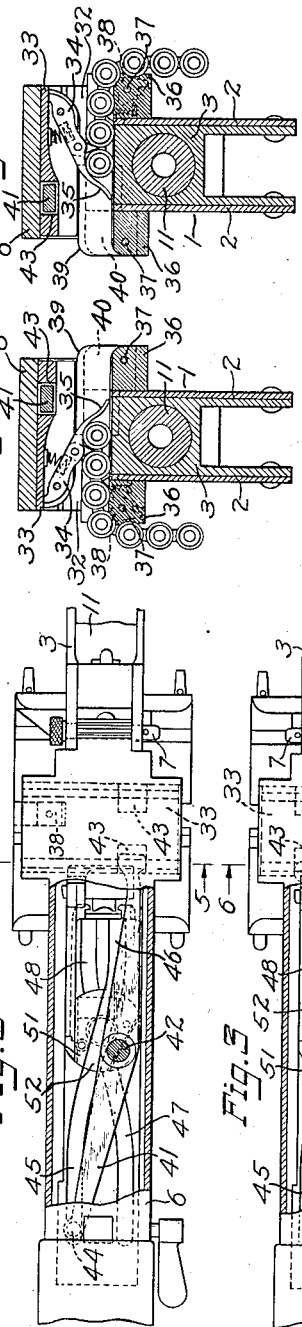
Inventor
Frederick T. Moore
By S. Jay Teller
Attorney Patented Nov. 21, 1933

1,936,254

UNITED STATES PATENT OFFICE

1,936,254

REVERSIBLE FEED MECHANISM FOR MACHINE-GUNS

Frederick T. Moore, East Hartford, Conn., assignor to Colt's Patent Fire Arms Manufacturing Co., Hartford, Conn., a corporation of Connecticut Application December 19, 1932
Serial No. 647,903

7 Claims. (Cl. 89—33)

The present invention relates particularly to a reversible feed mechanism for machine guns of the type disclosed in Patent No. 1,803,351 issued May 5, 1931 in the names of Frederick T. Moore and Christian Pfeiffer.

One of the objects of the invention is to provide in a feed mechanism of this type a simpler and more readily released means for preventing upward movement of the switch block.

Another object of the invention is to provide an automatic means for lifting the switch block when it is released so that it may be more readily grasped to facilitate changing the position thereof.

Other objects of the invention will be apparent from the following specification and claims.

In the drawing I have shown the embodiment of the invention which I now deem preferable, but it will be understood that the drawing is intended for illustrative purposes only and is not to be construed as defining or limiting the scope of the invention, the claims forming a part of this specification being relied upon for that purpose.

Of the drawing:

Fig. 1 is a vertical longitudinal sectional view through a machine gun embodying the invention.

Fig. 2 is a fragmentary plan view with a part of the cover broken away.

Fig. 3 is a view similar to Fig. 2 but showing certain parts of the feed mechanism in different positions.

Fig. 4 is a fragmentary side view of the breech bolt and extractor, the view being taken from the left side.

Fig. 5 is a transverse sectional view taken along the line 5—5 of Fig. 2.

Fig. 6 is a transverse sectional view taken along the line 6—6 of Fig. 3.

Fig. 7 is a detail plan view of the breech bolt.

Fig. 8 is a view similar to Fig. 7 but showing the movable cam block in a different position.

Fig. 9 is an enlarged fragmentary sectional view taken along the line 9—9 of Fig. 7.

Fig. 10 is a view similar to Fig. 9, but showing the cam block in its elevated position.

The machine gun as shown in the drawing comprises a breech casing 1 which contains the breech mechanism, this casing being rectangular in form and having two side plates 2, 2 connected at the front with a trunnion block 3. The rear part of the bottom of the casing is closed by a transverse bottom plate 4 and the rear part of the top of the casing is closed by the top plate 5. In front of the plate 5 there is also provided a cover 6 pivoted at 7 so that it can be swung upward to expose the interior parts. The casing is closed at the rear by means of a plate 8 which is vertically movable in grooves (not shown) formed in the two side plates 2. The plate 8 is held in place by a manually releasable pivoted latch 9. The plate 8 carries a buffer mechanism indicated as an entirety by 10.

Projecting from the casing at the front is a barrel 11 which upon recoil is movable rearward to a limited extent. The barrel extends through a bearing aperture 12 in the trunnion block 3 and it has another bearing at or near the forward end of the barrel jacket 13, the said jacket being carried by a flange 14 formed on the trunnion block. Connected with the barrel 11 at the rear end thereof and bodily movable therewith is a barrel extension 15. This barrel extension comprises two integrally formed side members which are connected at the rear by a recessed cross member 15ª.

Mounted on the barrel extension for longitudinal movement independently thereof is a breech bolt 16. This breech bolt is provided at its opposite sides with longitudinal tongues 16ª adapted to enter longitudinal grooves formed in the side members of the barrel extension. A reaction spring 17 is provided which extends into a longitudinal opening 18 in the breech bolt and which tends to hold the breech bolt in its forward position. Upon recoil this reaction spring is compressed and immediately tends to return the breech bolt in the forward direction.

Mounted in the rear lower part of the casing is a lock frame 19 comprising two side members lying closely adjacent the side walls 2 of the casing. Immediately in front of the lock frame 19 is a transverse block 20 secured to the bottom wall 4. When the parts are in their forward positions as shown in Fig. 1 and breech bolt is locked to the barrel extension by means of a lock bolt 21 vertically movable in a recess in the transverse portion 15ª of the barrel extension and entering a notch in the breech bolt. The lock bolt 21 is held in its upper locking position by means of the transverse block 20, but when the barrel extension and breech bolt move rearward, the said lock bolt is moved downward by means of cam surfaces 22 formed at the forward ends of the lock frame 19. This permits the breech bolt to move rearward independently of the barrel extension. When the parts are returned to their forward positions the lock bolt 21 is again moved to locking position by means of the cam surfaces 23 on the block 20.

Transversely pivoted on the lock frame 20 is a rock lever or accelerator 24 having a convex forward facing surface adapted to be engaged by the rear surface of the barrel extension. When the barrel extension moves rearward upon recoil the breech bolt is unlocked therefrom in the manner already described and the accelerator 24 is moved in the counter-clockwise direction. The upper end of the accelerator engages the surface 25 on the breech bolt and the accelerator thus serves to assist or accelerate the rearward movement of the bolt, acting as a means for transmitting the energy of the relatively heavy barrel extension and barrel to the lighter breech bolt.

The firing mechanism is not shown in detail as it constitutes no part of the present invention. Firing is effected by means of a trigger 26 acting through a lever 27.

At the left side of the breech bolt is an extractor 28 provided with a pivot stud 29 fitting a transverse horizontal hole in the breech bolt. As shown most clearly in Fig. 4, the extractor has an arcuate flange 30 which moves in an arcuate groove 31 in the bolt during normal action, the extractor being thus held in operative relationship with the bolt. However, when the bolt and extractor are removed from the gun, the extractor may be moved to an approximately vertical position as shown in Fig. 4, thus withdrawing the flange 30 from the groove 31. The extractor with its pivot stud 29 may then be withdrawn from the bolt.

The relative pivotal movements of the extractor are effected and controlled by suitable cams which are not fully shown, as the extractor operating means constitute no part of the present invention. As the breech bolt moves rearward the extractor withdraws a cartridge from the feed mechanism at the front, and moves it rearward and downward so that, upon the return movement of the breech bolt, the cartridge is pushed into the firing chamber at the rear end of the barrel ready to be fired. During the said return movement of the bolt the extractor is moved upward and restored to the position shown in Fig. 1.

Extending transversely through the gun near the front thereof is a feed channel 32 into which a cartridge belt may be fed either from the left or from the right. Mounted in a downward extension of the cover 6 immediately above the feed channel 32 is a feed slide 33 which is adapted to move transversely. This slide 33 carries a pawl 34 which is adapted to engage the forward cartridge of the cartridge belt to move it into firing position as shown in Fig. 5 or in Fig. 6. The slide 33 with the pawl 34 thereon is bodily reversible so as to be adapted to feed the belt from left to right as shown in Fig. 5 or from right to left as shown in Fig. 6. The pawl 34 preferably carries an extension 35 which is adapted to be secured thereto at the rear side thereof. When the slide and pawl are reversed as already referred to, this extension 35 is transferred from one side to the other so that in either case it is at the rear.

At the sides of the gun are blocks 36, 36 located imediately below the feed channel and serving to form the end portions thereof. Pins 37, 37 extend longitudinally through holes in these blocks and on one of these pins there is located a pawl 38 adapted to engage one cartridge of the belt to prevent backward movement thereof. When the belt is to be fed from left to right as shown in Fig. 5 the pawl is located at the left, and when the belt is to be fed from right to left as shown in Fig. 6, the pawl is located at the right. For limiting the movement of the front cartridge of the belt there are preferably provided suitable stops 39 and 40 which are held in place by means of one of the pins 37. When the feed is from left to right the said stops are at the right and when the feed is from right to left the said stops are at the left.

The means for feeding the cartridges in either direction includes not only the reversible slide 33 and the described parts associated therewith but also a slide operating device actuated by the reciprocating breech bolt. For this purpose there is preferably provided a feed lever 41 which is pivotally mounted on a stud 42 projecting downward from the cover 6. The slide 33 is provided with two notches 43, 43 and the forward end of the lever 41 projects into one or the other of these notches according to the position of the slide. At its rear end the lever 41 is adapted to operably engage suitable cam paths formed on the breech bolt 16. Ordinarily the cam paths on the breech bolt are formed by means of grooves in the upper face thereof and in this case the lever 41 is provided with a depending stud 44 adapted to extend into the grooves.

In accordance with the present invention there are two oppositely inclined overlapping or intersecting cam paths on the upper face of the breech bolt, one of these cam paths being adapted for use in feeding the cartridge belt from left to right and the other of them being adapted for use in feeding the cartridge belt from right to left. These cam paths are ordinarily formed by means of grooves in the upper face of the breech bolt and this grooved construction will now be described in detail.

There are two grooves 45 and 46 which form parts of the cam path used for feeding from left to right and there are two grooves 47 and 48 forming parts of the cam path used for feeding from right to left. These two cam paths are oppositely inclined and they preferably intersect at their central portions. The breech bolt is provided with a recess 49 at the position of intersection, this recess preferably being cylindrical in outline. Extending downward from the center of the recess is a vertical hole 50, preferably cylindrical. This vertical hole 50 partly intersects the before-mentioned horizontal hole for the extractor stud 29.

The recess 49 is normally filled or substantially filled by a cam block 51 which has a groove 52 therein. The block 51 has a depending stem 53 which fits the hole 50. The stem has a groove 54 therein, and the stud 29 of the extractor normally enters this groove 54 to prevent upward movement of the block.

The cam block 51 is movable about the axis of the stem 53 to occupy either of two positions as shown respectively in Figs. 2 and 7 and in Figs. 3 and 8. When the cam block 51 is in the position shown in Figs. 2 and 7 the groove 52 therein connects the two grooves 45 and 46 to complete one cam path, and when the cam block is in the position shown in Figs. 3 and 8 the groove 52 therein connects the two grooves 47 and 48 to complete the other cam path. Preferably the groove 54 in the stem 53 is circumferential to permit the stem to occupy different positions and nevertheless be engaged by the stud 29.

For holding the cam block 51 in either of its groove registering positions I preferably provide a pin 55 adapted to enter either one of two holes 56 and 57 formed in the bottom of the block. With the block in the position shown in Fig. 7, the pin 55 is in the hole 56; and with the block in the position shown in Fig. 8 the pin 55 is in the hole 57.

Preferably the pin 55 is a part of a movable plunger 58 pressed upward by a spring 59 as shown in Fig. 9. When the extractor is removed as already described, the block 51 is free to move upward, and it is automatically so moved by the spring plunger to the position shown in Fig. 10. In this elevated position it can be more conveniently grasped and moved to its alternate position. After being moved to its desired position, the block 51 is pressed downward and the extractor is again put in place so as to hold the block as already described.

When the cam block 51 is in the position shown in Figs. 2 and 7 with the stud 44 entered in the cam path formed by the grooves 45, 52 and 46, the lever 41 will be moved in the counter-clockwise direction as the breech bolt moves rearward. The lever moves the slide 33 far enough toward the left to enable the pawl 34 to engage the next cartridge of the belt, it being understood that in the meantime the first cartridge thereof has been withdrawn by the extractor already described. As the breech bolt again moves forward the lever 41 is rotated in the clockwise direction, thus moving the slide 33 and the pawl 34 toward the right and advancing the forward cartridge of the belt to the position shown in Fig. 5.

When it is desired to effect feeding from right to left instead of from left to right the cam block 51 is placed in the position shown in Figs. 3 and 8 and the stud 44 is entered in the cam path formed by the grooves 47, 52 and 48. The feed slide and the parts associated therewith are transferred to their reversed positions as shown in Fig. 6. The action of the feeding mechanism is exactly as already described except for the reversal of the directions of movement. The slide 33 is initially moved from left to right so that upon the return movement the cartridge will be fed from right to left.

What I claim is:

1. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess, the said bolt being also provided with a vertical hole extending downward from the recess and with a transverse horizontal hole partly intersecting the first said hole, a grooved cam block in the recess provided with a downward projecting grooved stem fitting the vertical hole in the bolt, the said block being relatively movable to bring the groove thereof into register with either of the grooves in the bolt and thereby complete either of the said cam paths, means adapted for feeding cartridges in either direction and including an element adapted to operatively engage either of the same cam paths, and an extractor having a transverse pivot stud fitting the horizontal hole in the bolt and extending into the groove in the cam block stem.

2. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess, the said bolt being also provided with a vertical hole extending downward from the recess and with a transverse horizontal hole partly intersecting the first said hole, a grooved cam block in the recess provided with a downward projecting grooved stem fitting the vertical hole in the bolt, the said block being relatively movable to bring the groove thereof into register with either of the grooves in the bolt and thereby complete either of the said cam paths, means adapted for feeding cartridges in either direction and including an element adapted to operatively engage either of the said cam paths; and an extractor having a transverse pivot stud normally fitting the horizontal hole in the bolt and extending into the groove in the cam block stem to prevent upward movement of the said block, the said extractor with its stud being readily removable to release the switch block and permit upward movement thereof.

3. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess, the said bolt being also provided with a vertical cylindrical hole extending downward from the recess and with a transverse horizontal cylindrical hole partly intersecting the first said hole, a grooved cam block in the recess provided with a downward projecting stem fitting the vertical hole in the bolt and having a circumferential groove therein, the said block being pivotally movable about the axis of the stem to bring the groove in the block into register with either of the grooves in the bolt and thereby complete either of the said cam paths, means adapted for feeding cartridges in either direction and including an element adapted to operatively engage either of the said cam paths, and an extractor having a transverse pivot stud fitting the horizontal hole in the bolt and extending into the groove in the cam block stem with the block in either of its groove registering positions.

4. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess and with a vertical hole extending downward from the recess, a grooved cam block in the recess provided with a downward projecting stem fitting the vertical hole in the bolt, the said block being relatively movable to bring the groove thereof into register with either of the grooves in the bolt and thereby complete either of the said cam paths, means adapted for feeding cartridges in either direction and including an element adapted to operatively engage either of the said cam paths, releasable means for holding the cam block to prevent upward movement thereof, and a spring serving to lift the cam block above its normal position upon the release of the holding means.

5. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess and with a vertical hole extending downward from the recess, a grooved cam block in the recess having two holes in the bottom thereof and provided with a downward projecting stem fitting the vertical hole in the bolt, the said block being pivotally movable about the axis of the stem to bring the groove thereof into register with either of the grooves in the bolt and thereby complete either of the said cam paths, means adapted for feeding cartridges in either direction and including an element adapted to operatively engage either of the said cam paths, releasable means for holding the cam block to prevent upward movement thereof, and a spring plunger adapted to enter either of the holes in the block to lock it in either of its groove registering positions, the said plunger also serving to lift the cam block above its normal position upon the release of the holding means.

6. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess, the said bolt being also provided with a vertical hole extending downward from the recess and with a transverse horizontal hole partly intersecting the first said hole, a grooved cam block in the recess provided with a downward projecting grooved stem fitting the vertical hole in the bolt, the said block being relatively movable to bring the groove thereof into register with either of the grooves in the bolt and thereby complete either of the said cam paths, means adapted for feeding cartridges in either direction and including an element adapted to operatively engage either of the said cam paths, a readily removable extractor having a transverse pivot stud fitting the horizontal hole in the bolt and extending into the groove in the cam block stem to prevent upward movement of the block, and a spring serving to lift the cam block above its normal position upon removal of the extractor.

7. The combination in a reversible feed mechanism for an automatic firearm, of a longitudinally movable breech bolt provided at the top with grooves forming incomplete parts of two oppositely inclined intersecting cam paths and provided at the intersection of the cam paths with a recess, the said bolt being also provided with a vertical hole extending downward from the recess and with a transverse horizontal hole partly intersecting the first said hole, a grooved cam block in the recess having two holes in the bottom thereof and provided with a downward projecting grooved stem fitting the vertical hole in the bolt, the said block being relatively movable to bring the groove thereof into register with either of the grooves in the bolt and thereby complete either of the said cam paths, means adapted for feeding cartridges in either direction and including an element adapted to operatively engage either of the said cam paths, a readily removable extractor having a transverse pivot stud fitting the horizontal hole in the bolt and extending into the groove in the cam block stem to prevent upward movement of the block and a spring plunger adapted to enter either of the holes in the block to lock it in either of its groove registering positions, the said plunger also serving to lift the cam block above its normal position upon the removal of the extractor.

FREDERICK T. MOORE.